(12) United States Patent
Chen

(10) Patent No.: US 8,714,100 B2
(45) Date of Patent: May 6, 2014

(54) POINTER-TYPE ALARM MARK STRUCTURE OF A MICRO-DIFFERENTIAL PRESSURE GAUGE

(75) Inventor: Li-Chen Chen, Bade (TW)

(73) Assignee: Hwa Chi Technology Co., Ltd., Taoyuan County (TW)

( * ) Notice: Subject to any disclaimer, the term of this patent is extended or adjusted under 35 U.S.C. 154(b) by 278 days.

(21) Appl. No.: 13/105,170

(22) Filed: May 11, 2011

(65) Prior Publication Data

US 2011/0285531 A1    Nov. 24, 2011

(30) Foreign Application Priority Data

May 20, 2010  (TW) ................................ 99209462 U

(51) Int. Cl.
*G01L 19/10*  (2006.01)
*G01D 13/22*  (2006.01)
*G01D 13/24*  (2006.01)

(52) U.S. Cl.
USPC ........... 116/271; 116/291; 116/296; 116/319; 116/328

(58) Field of Classification Search
USPC ......... 116/271, 291, 292, 293, 296, 300, 301, 116/304, 305, 316, 319, 320, 321, 323, 324, 116/326, 327, 328, 329, DIG. 6, DIG. 21, 116/DIG. 23, DIG. 46; 73/431, 700, 866.3
See application file for complete search history.

(56) References Cited

U.S. PATENT DOCUMENTS

| | | | | | |
|---|---|---|---|---|---|
| 1,723,390 | A | * | 8/1929 | Tingley | 116/316 |
| 1,945,456 | A | * | 1/1934 | Wardenburg | 116/293 |
| 2,577,491 | A | * | 12/1951 | Teter | 116/293 |
| 2,829,620 | A | * | 4/1958 | Wilson | 116/296 |
| 3,045,638 | A | * | 7/1962 | Davio | 116/306 |
| 3,089,340 | A | * | 5/1963 | Hageman | 374/111 |
| 3,403,657 | A | * | 10/1968 | Howitt | 116/293 |
| 3,996,881 | A | * | 12/1976 | Schneider | 116/204 |
| 4,513,604 | A | * | 4/1985 | Frantz et al. | 73/39 |
| 4,878,453 | A | * | 11/1989 | Inoue et al. | 116/288 |
| 2001/0039914 | A1 | * | 11/2001 | Chester | 116/328 |
| 2011/0290172 | A1 | * | 12/2011 | Yamauchi | 116/271 |

FOREIGN PATENT DOCUMENTS

| | | | | | |
|---|---|---|---|---|---|
| EP | 1215478 A2 | * | 6/2002 | | G01L 19/10 |
| JP | 11016079 A | * | 1/1999 | | G08C 15/00 |

* cited by examiner

*Primary Examiner* — R. A. Smith
(74) *Attorney, Agent, or Firm* — Chun-Ming Shih

(57) ABSTRACT

A pointer-type alarm mark structure of a micro-differential pressure gauge includes a transparent casing. The transparent casing has a shaft thereon. At least one alarm index is provided on the shaft. By adjusting the alarm index to a desired position, the user can know whether the pointer of the gauge is within a safe area.

5 Claims, 3 Drawing Sheets

POINTER-TYPE ALARM MARK STRUCTURE OF A MICRO-DIFFERENTIAL PRESSURE GAUGE

BACKGROUND OF THE INVENTION

1. Field of the Invention

The present invention relates to a pointer-type alarm mark structure of a micro-differential pressure gauge, and more particularly, to a pointer gauge structure having at least one alarm index coupled on a transparent casing.

2. Description of the Prior Art

A conventional gauge, such as a micro-differential pressure gauge or a pressure gauge, includes a pointer therein. The pointer is rotated according to the pressure. In conjunction with a numeral scale plate in the gauge, the user can read the value. In general, the gauge is set with a security value. For the user to know whether or not the pointer is in the range of safety, the gauge is provided with a safety mark. The conventional mark is secured on an outer edge of the gauge. When the gauge has to be installed in an embedded way, such as in a hole of a flat board of an apparatus, the mark cannot be attached to the gauge because the circumferential edge of the gauge is tightly against the flat board. Accordingly, the inventor of the present invention has devoted himself based on his many years of practical experiences to solve this problem.

SUMMARY OF THE INVENTION

The primary object of the present invention is to provide an alarm mark structure of a micro-differential pressure gauge. An alarm index is provided on a transparent casing, which doesn't exceed the circumference of the gauge, such that the alarm index can be easily coupled to the gauge which is installed in an embedded way.

In order to achieve the aforesaid object, there is provided a pointer-type alarm mark structure of a micro-differential pressure gauge. A transparent casing of a pressure gauge or a micro-differential pressure gauge has a shaft thereon. At least one alarm index is provided on the shaft. By adjusting the alarm index to a desired position, the user can know whether the pointer of the gauge is within a safe area.

Preferably, the alarm index has a shaft hole for insertion of the shaft of the transparent casing. By the shaft hole and the shaft, the alarm index is rotatable to provide an alarm effect.

Preferably, the shaft and the shaft hole are engaged each other to prevent an unexpected movement of the alarm index.

Preferably, the alarm index has a pointed end for the user to know the position of the alarm index.

Preferably, the alarm index is colored, such as red, to provide an alarm effect.

Preferably, the alarm index has an adjustment portion at one end thereof for the user to change the position of the alarm index.

DETAILED DESCRIPTION OF THE PREFERRED EMBODIMENTS

Embodiments of the present invention will now be described, by way of example only, with reference to the accompanying drawings.

Figure 1:
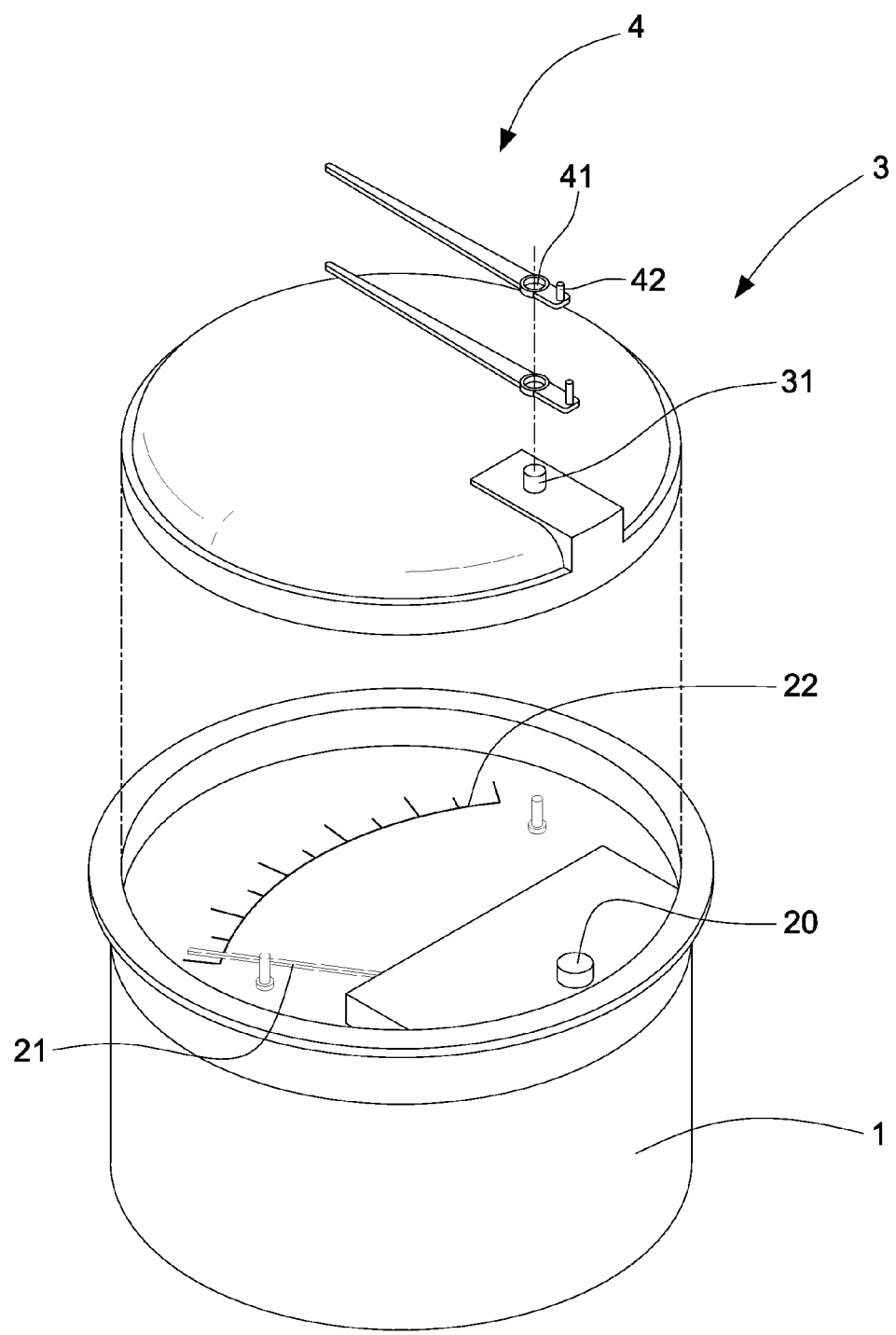
FIG. 1 is an exploded view according to a preferred embodiment of the present invention.
Figure 2:
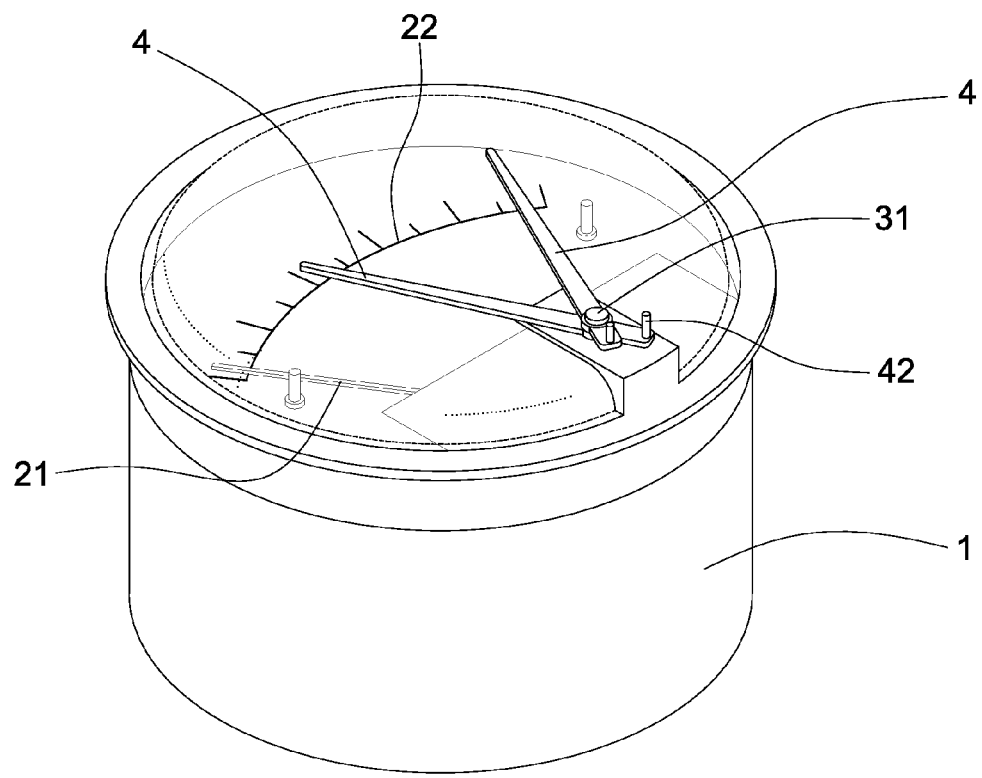
FIG. 2 is a perspective view according to the preferred embodiment of the present invention.

As shown in FIG. 1 and FIG. 2, a pointer-type alarm mark structure of a micro-differential pressure gauge according to a preferred embodiment of the present invention comprises a gauge base 1, a transparent casing 3, and at least one alarm index 4.

The gauge base 1 is incorporated with other parts to become a pointer gauge which may be a pressure gauge or a micro-differential pressure gauge. The gauge base 1 comprises a pointer 21, an axle 20 and a scale plate 22 therein. The pointer 21 can be moved through the axle 20 in accordance with the inside pressure to display the numerical value on the scale plate 22.

The transparent casing 3 is coupled on the gauge base 1. The transparent casing 3 has a shaft 31 corresponding in position to the axle 20. The shaft 31 and the axle 20 are coaxial.

The alarm index 4 has a shaft hole 41 for insertion of the shaft 31. By the shaft hole 41 and the shaft 31, the alarm index 41 is rotatable to provide an alarm effect. The alarm index 4 has an adjustment portion 42 at one end thereof.

Figure 3:
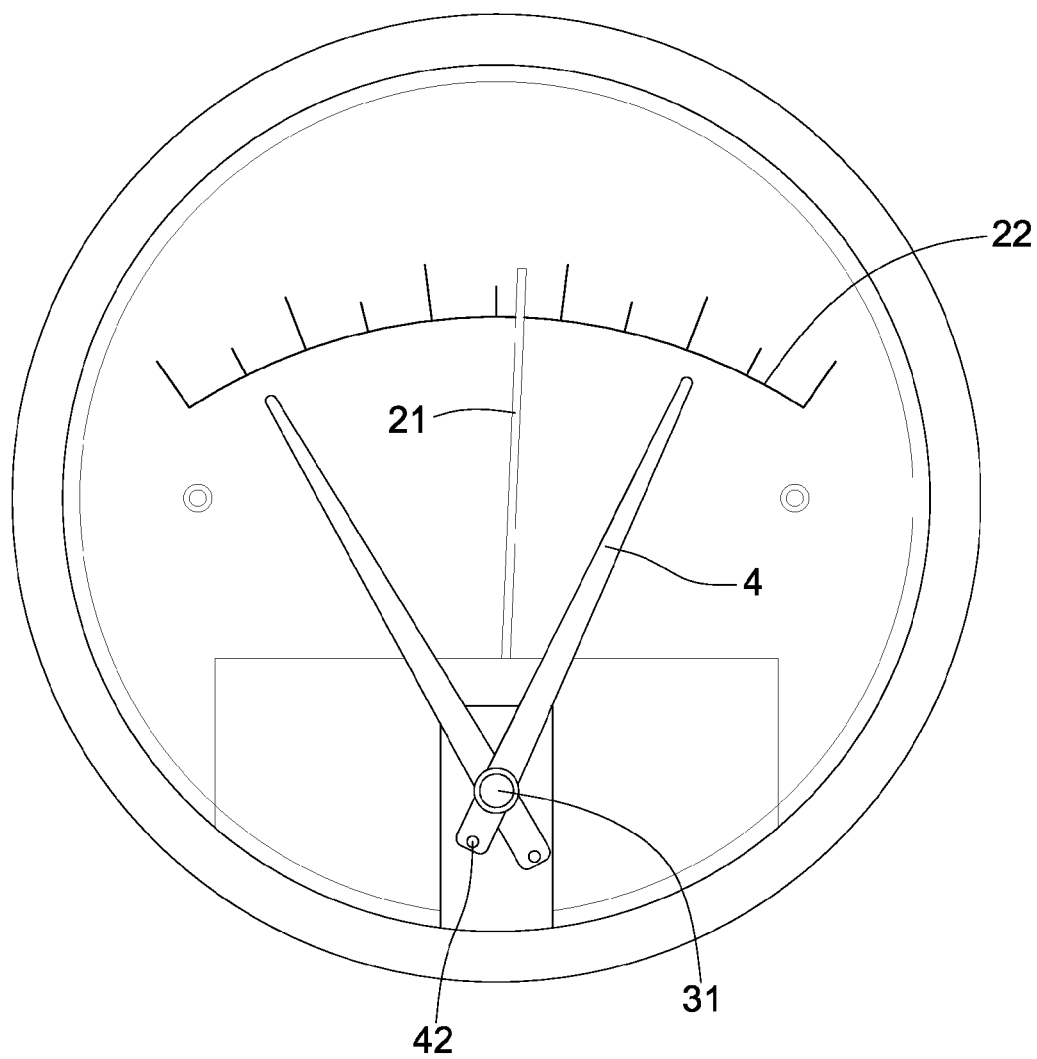
FIG. 3 is a top view according to the preferred embodiment of the present invention.

By adjusting the alarm index 4 to a desired position, the user can know whether the pointer 21 is within a safe area, as shown in FIG. 3.

Preferably, the alarm index 4 has a pointed end for the user to know the position of the alarm index 4 with ease. The alarm index 4 is colored, such as red, to provide an alarm effect.

The shaft 31 of the present invention and the axle 20 of the pointer 21 are coaxial, so the alarm index 4 can be precisely adjusted within the range of movement of the pointer 21.

What is claimed is:

1. A pointer-type alarm mark structure of a micro-differential pressure gauge, comprising:
    a gauge base comprising a pointer, an axle and a scale plate therein, the pointer moving about the axle to display a numerical value on the scale plate;
    a transparent casing coupled on the gauge base, the transparent casing having a front surface exposed outside, and a shaft formed on the front surface; and
    two alarm indexes, each alarm index having an adjustment pole at one distal end thereof and a shaft hole for insertion of the shaft of the transparent casing, and being rotatable through the shaft hole and the shaft.

2. The pointer-type alarm mark structure of a micro-differential pressure gauge as claimed in claim 1, wherein the shaft of the transparent casing and the axle of the gauge base are coaxial.

3. The pointer-type alarm mark structure of a micro-differential pressure gauge as claimed in claim 1, wherein the shaft of the transparent casing and the shaft hole of the alarm index engage each other.

4. The pointer-type alarm mark structure of a micro-differential pressure gauge as claimed in claim 1, wherein the alarm index has a pointed end.

5. The pointer-type alarm mark structure of a micro-differential pressure gauge as claimed in claim 1, wherein the alarm index is colored.

* * * * *